United States Patent [19]

Kawasaki et al.

[11] Patent Number: 5,418,081

[45] Date of Patent: *May 23, 1995

[54] METHOD OF PRODUCING ELECTRICALLY CONDUCTIVE CERAMIC FILM FOR INTERCONNECTORS OF SOLID OXIDE FUEL CELLS

[75] Inventors: Shinji Kawasaki; Kiyoshi Okumura; Katsuki Yoshioka, all of Nagoya, Japan

[73] Assignee: NGK Insulators, Ltd., Japan

[*] Notice: The portion of the term of this patent subsequent to Jul. 26, 2011 has been disclaimed.

[21] Appl. No.: 858,049

[22] Filed: Mar. 26, 1992

[30] Foreign Application Priority Data

Mar. 28, 1991 [JP] Japan .................. 3-087354

[51] Int. Cl.⁶ ............................................. H01M 8/12
[52] U.S. Cl. .................................... 429/33; 429/30; 429/193; 427/115; 427/453
[58] Field of Search ..................... 427/126.3, 115, 453; 429/193, 33, 30, 31; 501/152

[56] References Cited

U.S. PATENT DOCUMENTS

| | | | |
|---|---|---|---|
| 4,421,799 | 12/1983 | Novinski | 427/453 |
| 4,562,124 | 12/1985 | Ruka | 429/31 X |
| 4,857,420 | 8/1989 | Maricle et al. | |
| 4,910,100 | 3/1990 | Nakanishi et al. | 429/35 X |
| 5,234,722 | 8/1993 | Ito et al. | 429/33 X |

FOREIGN PATENT DOCUMENTS

| | | |
|---|---|---|
| 0326944 | 8/1989 | European Pat. Off. |
| 0338823 | 10/1989 | European Pat. Off. |
| 410420 | 1/1991 | European Pat. Off. |
| 0410420 | 1/1991 | European Pat. Off. |
| 0476808 | 3/1992 | European Pat. Off. |
| 0497542 | 8/1992 | European Pat. Off. |
| 1528247 | 6/1968 | France |
| 3922673 | 1/1991 | Germany |
| 89/08332 | 9/1989 | WIPO |

OTHER PUBLICATIONS

Scagliotti et al. "Structural Properties of Plasma-Sprayed Zirconia-Based Electrolytes," J. Mats. Su., 23 (Oct. 1988) pp. 3764–3770.
Patent Abstracts of Japan, vol. 16, No. 230 (E-1208) 27 May 1992 & JP-A-04 043 565 (Meidensha Corp) 13 Feb. 1992.
Journal of The American Ceramic Society, vol. 74, No. 3, Mar. 1991, Columbus US pp. 501–504, Lone-Wen Tai et al. "Plasma Spraying of Porous Electrodes for a Planar Solid Oxide Fuel Cell".
American Ceramic Society Bulletin, vol. 42, No. 1, Jan. 1963, Columbus US pp. 6–9, J. L. Bliton et al. "Flame Sprayed Zirconia Films For Fuel Cell Components".
Journal of Materials Science, vol. 23, No. 10, 10 Oct. 1988 London (GB), pp. 3764–3770, M. Scagliotti et al. "Structural Properties of Plasma-Sprayed Zirconia-Based Electrolytes".
Sunshine Journal, vol. 2, No. 1, 1981 (no month).

*Primary Examiner*—John S. Maples
*Attorney, Agent, or Firm*—Parkhurst, Wendel & Rossi

[57] ABSTRACT

An electrically conductive ceramic film having a large size and surface area, a complicated configuration and a high electrical conductivity can be provided by the present melt spray method. The method includes melt spraying a raw material of an electrically conductive ceramic on a substrate to form a melt sprayed film, and heat treating the melt spray film to produce the electrically conductive ceramic film.

9 Claims, No Drawings

METHOD OF PRODUCING ELECTRICALLY CONDUCTIVE CERAMIC FILM FOR INTERCONNECTORS OF SOLID OXIDE FUEL CELLS

BACKGROUND OF THE INVENTION

1. Field of the Invention

The present invention relates to a method of producing an electrically conductive film using a melt spray technique.

2. Related Art Statement

Recently, electrically conductive ceramics have attracted attention as functional materials, such as, ion conductive bodies, and electron conductive bodies. This is because ceramics, different from metals, are stable at high temperature atmospheres of around 1,000° C., so that they can be used at various sites for which metals are not usable due to difficulty pertaining to electrical connection at such high temperatures. A typical application example thereof is high temperature type solid electrolyte fuel cells which operate at high temperatures of around 1,000° C. and wholly made of an electrically conductive ceramic. For example, yttria stabilized zirconia used as a solid electrolyte is an oxygen ion conductive body, lanthanum manganate used as an air electrode is an ion/electron mixture conductive body, and lanthanum chromate used as interconnectors or separators for connecting unit cells is an electron conductive body.

As techniques for forming such electrically conductive ceramic films, there can be considered a wet process, such as, doctor blade method, and slip casting method, and a gas phase method, such as, physical vapor deposition method (PVD) and chemical vapor deposition method (CVD). However, a wet process can not cope with complicated configurations, while a gas phase method is slow in film-forming rate, is not suitable for obtaining films of large sizes or large surface areas, and is considerably expensive in production cost.

As a method of removing these drawbacks, a melt spray technique, particularly, a plasma melt spray method, has recently attracted attention for forming electrically conductive ceramic films. This is because films of large surface areas can be formed at a high rate by melt spray methods contrary to the above gas phase method, and still can cope with films of complicated and large shape sizes contrary to the wet process.

For instance, for forming the above high temperature type solid electrolyte fuel cells a method has hitherto been used of using plasma melt spray to form constitutional members of the cells (Sunshine, Vol. 2, No. 1, 19981).

However, electrically conductive ceramic films obtained by plasma melt spray method have generally higher activation energies participating in electric conduction than those of polycrystalline bodies obtained by usual powder sintering methods. This means that, if ceramic films of a same density are prepared by a melt spray method and a powder sintering method, those ceramic films prepared by the melt spray method have lower electrical conductivities than those prepared by the powder sintering method. From a functional aspect of electrical conductivity, this incurs a loss of energy.

In such a case, most of electrically conductive ceramic films show semiconductor-like electrical conductive behaviours, so that a method can be considered of raising the atmosphere temperature to improve the electrical conductivities thereof. However, this method requires an excessive energy for intentionally raising the temperature, hence it is not a practical method. For example, in the case of the above solid electrolyte fuel cells, deterioration of the electrical conductivity of each constitutional element means decrease of output of the fuel cells. Moreover, fuel cells are generally operated at around 1,000° C. at present, and an increase of the operation temperature of the cells causes packaging and gas-sealing of the cells to become more difficult. Therefore, plasma melt spray films having small activation energies and electrical conductivities at high temperatures approximately equal to those prepared by powder sintering method have been requested and a method of producing the same has been earnestly desired.

SUMMARY OF THE INVENTION

An object of the present invention is to provide a method of producing electrically conductive ceramic films by melt spraying having small activation energies participating in electrical conduction and high temperature electrical conductivities approximately equal to those of electrically conductive ceramic films prepared by the solid sintering method.

The present invention is a method of producing an electrically conductive ceramic film, comprising melt spraying a raw material of an electrically conductive ceramic on a substrate to form a melt sprayed film, and heat treating the melt sprayed film to produce the electrically conductive ceramic film.

The expression "an electrically conductive ceramic" used herein means a ceramic which transports electric charge at at least a given use condition, such as, an ion-conductive body, an electron-conductive body or an ion/electron mixture-conductive body.

As a raw material for melt spraying an electrically conductive ceramic, use may be made of a powder having a desired crystalline phase before the melt spraying, a powder which has come to have a desired crystalline phase after the melt spraying, or a powder which has come to have a desired crystalline phase after the heat treating of the melt sprayed film, with the understanding that the finally obtained electrically conductive ceramic film has a desired crystalline phase. The raw material powder is preferably a granulated powder having a high fluidity and particle sizes suited to a device for the melt spraying operation.

The heat treatment is effected under a heat treating condition capable of obtaining a shrinkage of the size of the melt sprayed film.

The heat treatment includes both a case of heat treating the melt sprayed film and if necessary a portion of the substrate, and a case of heat treating the melt sprayed film and if necessary the whole substrate. For the heat treatment, a heating system, such as, an electric furnace, a gas furnace, a fuel furnace using heavy oil or light oil, and a laser beam system may be used. Among these, particularly preferable is an electric furnace wherein the the melt sprayed film and if necessary the whole substrate are uniformly heat treated.

The production method of the present invention can be applied to the production of various electrically conductive ceramic films constituting so-called high temperature type solid electrolyte fuel cells. Among these films, air electrode films can be made of undoped or doped electrically conductive perovskite type oxides, such as, $LaMnO_3$, $CaMnO_3$, $LaNiO_3$, $LaCoO_3$, LaCrO$_3$, etc., and LaMnO$_3$ doped with strontium is preferable. Ion conductive ceramic films are preferably made of zirconia, more preferably made of zirconia stabilized or partially stabilized with yttria, calcia, magnesia, or ceria. Interconnectors are preferably made of electrically conductive perovskite type LaCrO$_3$, etc.

According to the present invention, the melt spray films are heat treated, so that the prior defects in the sprayed films which had an adverse influence resulting in an increase of the activation energy can be obviated, and a microscopically homogeneous polycrystalline structure can be prepared which can decrease the activation energy of the electrically conductive ceramic films. As a result, the electrically conductive ceramic films produced according to the present invention have electrical conductivities at high temperatures nearly equal to those prepared by the powder sintering method, even though they were produced by the melt spray method.

According to the present invention, the melt sprayed films are heat treated to produce electrically conductive ceramic films, so that the activation energies of the electrically conductive ceramic films, which is a principle physical quantity determining the electrical conductivity of the electrically conductive ceramic films, are lower than those of the conventional melt sprayed films. Therefore, the electrically conductive ceramic films prepared according to the present invention have not only higher electrical conductivities in a same circumstance, but also smaller change of electrical conductivities and hence higher stabilities relative to temperature changes than the melt sprayed films having a same relative density. In addition, the electrically conductive ceramic films can attain the same properties with those of prior melt sprayed films at lower temperatures, so that high temperature type solid electrolyte fuel cells can be operated at lower temperatures, if the present invention is applied to high temperature type solid electrolyte fuel cells, for example.

DESCRIPTION OF THE PREFERRED EMBODIMENTS

Hereinafter, the present invention will be explained in more detail with reference to examples.

EXAMPLE 1

In this example, an example of producing lanthanum manganate films doped with strontium which are used as air electrode films of high temperature type solid electrolyte fuel cells as ion/electron mixture conductive porous conductors will be explained.

Manganese acetate (Mn(CH$_3$COO)$_2$.4H$_2$O), lanthanum acetate (La(CH$_3$COO)$_3$.3/2H$_2$O), and strontium acetate (Sr(CH$_3$COO)$_2$.$\frac{1}{2}$H$_2$O) were respectively weighed at a weight ratio of 11.91:10.00:4.17, and pure water of about 6 weight ratio relative to these material powders was weighed and heated on an evaporation dish of alumina placed on an hot stirrer. The above material powders were gradually added in an arbitrary order to the pure water under agitation to dissolve the same.

Next, the solution was gradually elevated in temperature while agitating by a rotor made of teflon to evaporate water therefrom. The rotor was drawn out from the solution at the time when the viscosity of the solution was increased, and thereafter the solution was evaporated to dryness while agitating by means of a spatula. By this process, a powder mixture of raw materials was obtained.

The thus obtained powder was put in an alumina crucible and calcined in air at 900° C. for 10 hrs. The thus obtained powder was ground in a mortar and passed through a 44 μm sieve to obtain a raw material powder.

The raw material powder was analyzed on particle size by laser diffraction to find out an average particle diameter of 2.2 μm. The powder was further calcined in air at 1,250° C. for 5 hrs, ground in a mortar, and passed through a 44 μm sieve to obtain a powder of an average particle size of 12 μm.

This raw material powder for melt spraying electrically conductive ceramics was analyzed by X-ray diffraction to ascertain crystal phases thereof to find out that it was made of hexagonal lanthanum manganate. The powder was analyzed by ICP spectrometry to find out that it has a composition of the purposed La$_{0.6}$Sr$_{0.4}$MnO$_3$.

In the meantime, plate-shaped substrates made of zirconia of a size of 50×30×1 mm having a porosity of about 20% were prepared. The aforedescribed raw material powder for melt spraying La$_{0.6}$Sr$_{0.4}$MnO$_3$ was plasma melt sprayed on the substrates by using a plasma melt spray device. In that time, the plasma melt spraying was adjusted to obtain porous plasma melt sprayed films so as to simulate an air electrode of a high temperature type solid electrolyte fuel cell. More concretely explained, the plasma melt spray was effected on substrates inclined about 20 degree from a surface vertical to the axis of the plasma melt spray.

Thereafter, thus obtained samples were removed of the zirconia portion by grinding and the surface portion of the plasma melt sprayed films were also ground to obtain flatness or smoothness thereof. As a result, plasma melt sprayed films of La$_{0.6}$Sr$_{0.4}$MnO$_3$ of a thickness of about 500 μm were obtained. The plasma melt sprayed films were measured on their open pore porosity by water substitution to obtain a porosity of about 18%.

Then, the samples of the plasma melt sprayed films were heat treated in an electric furnace in air at a different level of 1,100° C., 1,200° C., 1,300° C., or 1,400° C. for 3 hrs and size change and open pore porosity of the samples after the heat treatment were measured (Examples 1-1~1-4). The results are shown in the later described Table 1 together with the result of Comparative Example 1.

The four types of the samples were processed to thin film discs of an outer diameter of 16 mm, applied at both surfaces with platinum paste of a diameter of 6 mm, and baked in air at 1,050° C. in air for 30 min to form electrodes for measuring electrical conductivity of the films. The thus obtained samples were applied with an alternating current of 100 kHz-0.1 Hz in air at a temperature of 800° C., 900° C., or 1,000° C. using a frequency response analyzer to measure electrical conductivity thereof by impedance method. The results are also shown in Table 1.

For comparison, the samples of plasma melt sprayed films prepared by the method of Example 1 without heat treating were measured on their electrical conductivity at 800° C., 900° C., and 1,000° C. by the impedance method in the same manner as in Example 1 to obtain the results of Comparative Example 1 as shown also in Table 1.

From the measured results of the electrical conductivity of Example 1 and Comparative Example 1, activation energy values are also shown in Table 1 calculated by the Nernst-Einstein formula:

$$\sigma T = \sigma_o \exp(-E_o/kT)$$

wherein $\sigma$ is electrical conductivity, $\sigma_o$ is proportional constant, T is absolute temperature, k is Boltzmann constant, and $E_o$ is activation energy.

For reference, the raw material powder before calcination produced in Example 1 was added and mixed with an aqueous solution of 20% polyvinyl alcohol as a binder, and 2.5 wt % or 2.7 wt % of cellulose powder as a pore increasing agent, press molded in a metal mold under a pressure of 200 kgf/cm², and fired in air at 1,550° C. for 5 hrs to obtain a powder sintered body of Referential Example 1. The sintered body of Referential Example 1 was measured in the same manner as in Example 1. The results are also shown in Table 1.

By comparing the Referential Example 1, the Example 1, and the Referential Example 1, it can be understood that the microscopic quality of the lanthanum manganate film obtained by the plasma melt spray approached to the quality of the polycrystalline sintered bodies of the Referential Example 1 and the Referential Example 1 by the heat treatment.

EXAMPLE 2

In this example, an example of producing a zirconia film stabilized by yttria as an ion conductive ceramic film is shown.

A powder of a commercial zirconia (8YSZ) stabilized by 8 mol % of yttria having an average particle diameter of about 27 μm for plasma melt spray was plasma melt sprayed on a stainless steel flat plate of a size of 50×30×1.5 mm to a thickness of about 600 μm. Thereafter, the sample was immersed in hydrochloric acid of about 80° C. to peel off the stainless steel flat plate from the plasma melt spray film. Both sides of the thus ob-

TABLE 1

| Example | Composition | Heat treating condition (°C. × 3 hrs) | Open pore porosity (%) | Size change (Shrinkage %) | Electrical conductivity (S/cm) 800° C. | 900° C. | 1000° C. | Activation energy (eV) |
|---|---|---|---|---|---|---|---|---|
| Invention | | | | | | | | |
| 1-1 | $La_{0.6}Sr_{0.4}MnO_3$ | 1100 | 18 | 0.0 | 103 | 108 | 110 | 0.14 |
| 1-2 | " | 1200 | 18 | 0.2 | 105 | 109 | 110 | 0.13 |
| 1-3 | " | 1300 | 16 | 1.9 | 107 | 111 | 112 | 0.13 |
| 1-4 | " | 1400 | 13 | 4.1 | 109 | 112 | 114 | 0.13 |
| Comparative 1 | " | — | 18 | — | 103 | 108 | 110 | 0.14 |
| Referential 1 | " | — | 17 | — | 106 | 110 | 112 | 0.13 |

As seen from Table 1, shrinkages of the size of the plasma melt sprayed films are observed at a heat treating temperature of 1,200° C. or more. At a heat treating condition of 1,200° C. or more at which the size change or shrinkage was observed, activation energy of Example 1 is decreased relative to that of Comparative Example 1. The samples heat treated at 1,100° C. which did not show the size change has not a remarkable electrical conductivity nor activation energy as compared to those of the non-heat treated sample of the Comparative Example 1. At a heat treating condition of 1,300° C. or 1,400° C., the sample of Example 1 shows an activation energy which has no remarkable difference from that of the sample heat treated at 1,400° C., however, shows an improved electrical conductivity as compared with the sample heat treated at 1,400° C. This is considered due to an improved sintering of the film to densify the same, seeing the measured result of the open pore porosity.

As seen from the foregoing results, by heat treating the melt sprayed films at least at a temperature condition of initiating the size change, electrically conductive ceramic films can be obtained having an effectively improved electrical conductivity, while preventing the function of the heat treating on the plasma melt sprayed porous film structure to the minimum. Namely, electrically conductive ceramic films having an improved electrical conductivity and a decreased activation energy can be obtained, while maintaining the original porosity of the plasma melt sprayed film. If a more dense film structure is required, the heat treating temperature can be raised further to decrease the activation energy of the film and simultaneously further densify the film structure.

tained plasma melt spray film were ground to give smoothness.

The thus obtained sample was heat treated in air in an electric furnace at either one level of four levels of 1,200° C., 1,300° C., and 1,350° C. for 3 hrs (Example 2-1~2-2) to measure size change and open pore porosity by means of water substitution method after the heat treatment. The results are shown in the following Table 2.

The above 4 samples of Example 2-1~2-2 were measured on electrical conductivity by impedance method in the same manner as in Example 1. The results are also shown in Table 2.

For comparison, a sample was produced in the same manner as in Example 2 however without conducting the heat treatment (Comparative Example 2), and open pore porosity by means of water substitution method and electrical conductivity at 800° C., 900° C., and 1,000° C. by means of impedance method were measured in the same manner as in Example 1. The results of Comparative Example 2 are also shown in Table 2.

From the results of the measurements of the electrical conductivity of Example 2 and Comparative Example 2 are calculated activation energy values based on the aforementioned Nernst-Einstein equation, which are shown in Table 2.

For reference, a powder of commercial zirconia stabilized with 8 mol % of yttria was press molded in a metal mold under a pressure of 500 kgf/cm², and fired in air at 1,550° C. for 5 hrs to obtain a powder sintered body of Referential Example 2. The powder sintered body of Referential Example 2 was measured in the same manner as described above. The results are also shown in Table 2.

TABLE 2

| Example | Composition | Heat treating condition (°C. × 3 hrs) | Open pore porosity (%) | Size change (Shrinkage %) | Electrical conductivity (S/cm) 800° C. | 900° C. | 1000° C. | Activation energy (eV) |
| --- | --- | --- | --- | --- | --- | --- | --- | --- |
| Invention | | | | | | | | |
| 2-1 | $(ZrO_2)_{0.92}(Y_2O_3)_{0.08}$ | 1200 | 9.0 | 0.0 | 1.3 | 3.0 | 5.7 | 1.0 |
| 2-2 | " | 1300 | 7.2 | 0.4 | 2.2 | 5.0 | 8.5 | 0.9 |
| 2-3 | " | 1350 | 5.8 | 0.7 | 3.1 | 7.2 | 12 | 0.9 |
| 2-4 | " | 1550 | 3.0 | 1.4 | 4.0 | 9.0 | 15 | 0.9 |
| Comparative 2 | " | — | 9.0 | — | 1.2 | 3.0 | 5.7 | 1.0 |
| Referential 2 (Sintered body) | $(ZrO_2)_{0.92}(Y_2O_3)_{0.08}$ | — | 0.9 | — | 5.3 | 11 | 19 | 0.9 |

As seen from Table 2, substantial size shrinkages were observed at temperatures of 1,300° C. or more. Thus, it can be understood that, by heat treating the plasma melt spray films at 1,300° C. or more at which the size shrinkages were observed, the resultant zirconia films stabilized with 8 mol % of yttria have improved electrical conductivities and decreased activation energies.

Also, it can be understood that, by comparing the Referential Example 2 with Example 2 and Comparative Example 2, zirconia films stabilized with 8 mol % of yttria also have plasma melt sprayed films of microscopic quality approaching the microscopic quality of a polycrystalline powder sintered body due to the heat treatment, similarly as in the case of Example 1.

Although the present invention has been explained with reference to specific examples and numerical values, it is of course apparent to those skilled in the art that various changes and modifications thereof are possible without departing from the broad spirit and aspect of the present invention as defined in the appended claims.

What is claimed is:

1. A method of producing an electrically conductive $LaCrO_3$ ceramic oxide film of perovskite structure for interconnectors of solid oxide fuel cells, comprising the steps of melt spraying a raw material of electrically conductive $LaCrO_3$ ceramic on a substrate to form a melt sprayed film, and heat treating the melt sprayed film to produce the electrically conductive $LaCrO_3$ ceramic oxide film.

2. The method of claim 1, wherein the melt sprayed film is heat treated in a furnace uniformly as a whole.

3. The method of claim 1, wherein the heat treating is effected under a heat treating condition capable of obtaining a shrinkage of the size of the melt sprayed film.

4. The method of claim 3, wherein the heat treating is effected at a temperature of at least 1,200° C.

5. The method of claim 1, wherein the electrically conductive ceramic is an ion-conductive body, an electron-conductive body or an ion/electron mixture-conductive body.

6. The method of claim 1, wherein the raw material of the electrically conductive ceramic is one of a powder having a desired crystalline phase before the melt spraying, a powder which has come to have a desired crystalline phase after the melt spraying, and a powder which has come to have a desired crystalline phase after the heat treating of the melt sprayed film, such that the finally obtained electrically conductive ceramic oxide film has a desired crystalline phase.

7. The method of claim 1, wherein at least a portion of the substrate is heated.

8. The method of claim 1, wherein the melt sprayed film and the whole substrate are heated uniformly in an electric furnace.

9. The method of claim 1, wherein the electrically conductive $LaCrO_3$ ceramic oxide film of perovskite structure is doped.

* * * * *